Oct. 28, 1930.  L. T. FREDERICK  1,779,426
METHOD OF VENEERING LUMBER AND THE LIKE AND RESULTING PRODUCT
Filed June 10, 1929
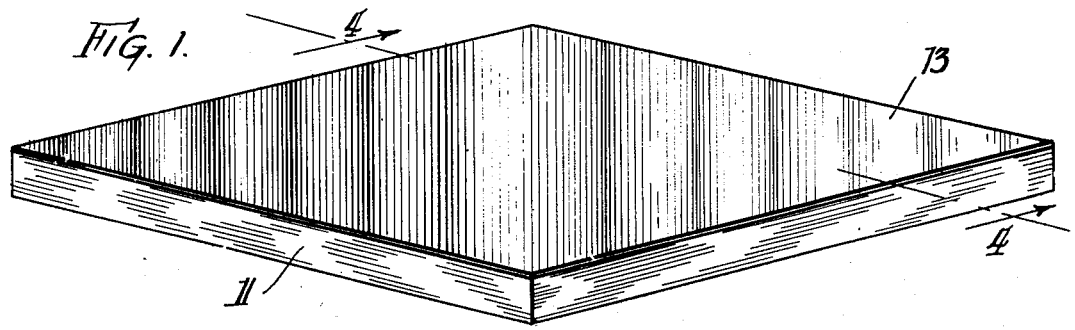
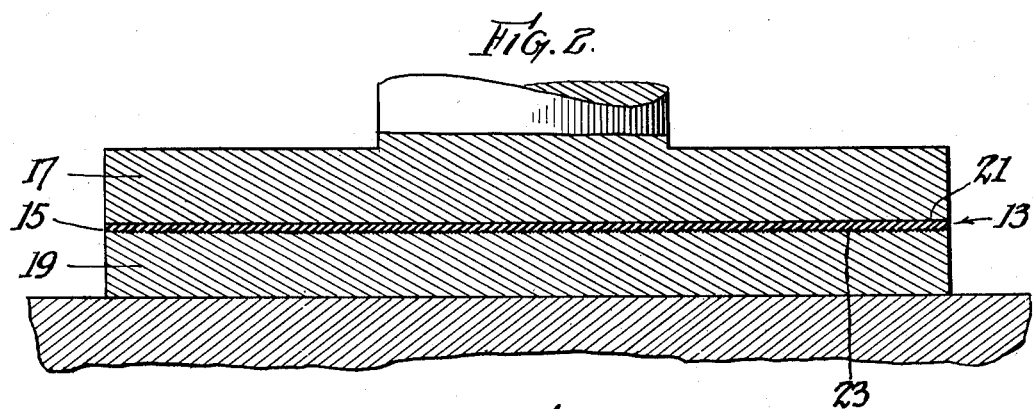
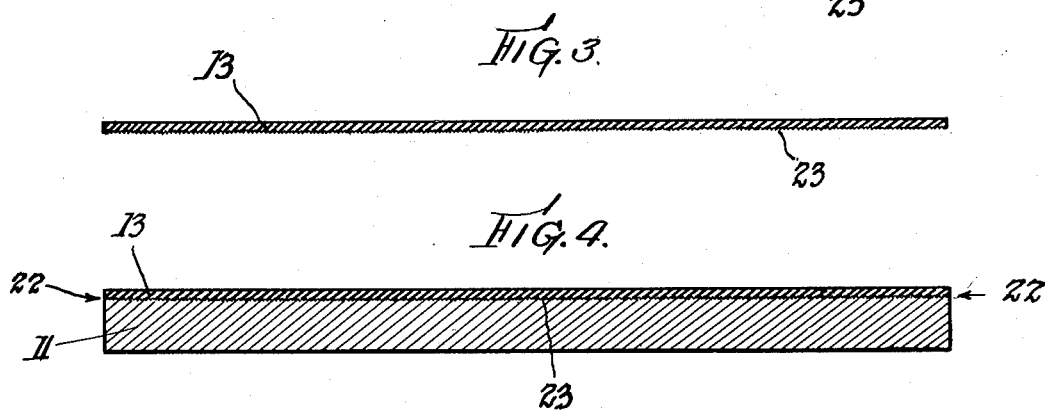
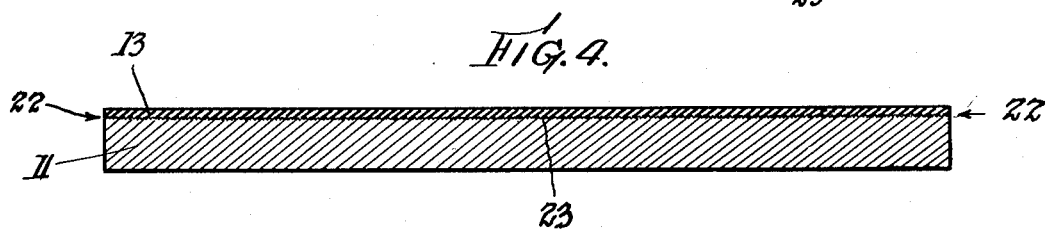
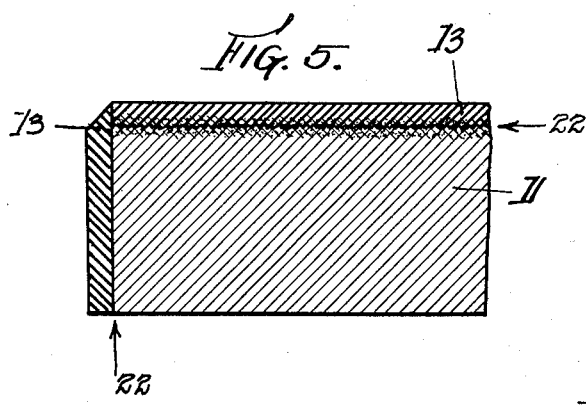
INVENTOR
LOUIS T. FREDERICK
BY Cheever, Cox & Moore
ATTYS Patented Oct. 28, 1930

1,779,426

UNITED STATES PATENT OFFICE

LOUIS T. FREDERICK, OF VALPARAISO, INDIANA, ASSIGNOR, BY MESNE ASSIGNMENTS, TO CONTINENTAL DIAMOND FIBRE COMPANY, OF NEWARK, NEW JERSEY, A CORPORATION OF DELAWARE

METHOD OF VENEERING LUMBER AND THE LIKE AND RESULTING PRODUCT

Application filed June 10, 1929. Serial No. 369,868.

My invention relates in general to the veneering of lumber or similar fibrous material with a film of thermo-plastic heat curable material in which bakelite, which is the re-action product of phenol and formaldehyde, and glyptal, which is the re-action product of glycerol and phthalic anhydride, are assembled. Resins of this general nature after being cured form extremely hard, inert substances, resistant to acid and moisture and fire resistant to such an extent that a lighted match or cigarette will have very little, if any effect. In view of these moisture, fire and acid resisting properties, it is specially desirable to form a veneer of such resins in their final cured state upon wood used for the tops of tables, desks, and the like, or upon fibrous products, such as the so-called celotex product, beaver board and the like. In addition fibrous material such as wood, wood fibre and the like when veneered with a film of cured material of the class described are highly resistant to abrasion, acid and corrosives, such as are frequently found in cleaning agents, oil and other agents of depreciation.

Attempts have heretofore been made to veneer pieces of wood and the like with heat curable resins but since, in order to obtain a sufficient curing of the resinous material, it is necessary to submit the synthetic resin to considerable heat and to a high degree of pressure, the material is frequently crushed and/or warped to an appreciable extent by the curing heat and pressure.

An important object of my present invention is to provide a means for and method of applying a veneer of heat curable material in its final cured state to lumber or similar fibrous material, it being my purpose to provide a method of veneering without deleteriously affecting the fibrous base, either by crushing or causing the material to warp during the application of the veneer, so that the lumber will maintain its original thickness and cellular structure.

Another important object of my invention is to provide a manufactured article consisting of a piece of fibrous or woody base provided with a veneered surface of heat curable material in its final cured condition.

Numerous other objects and advantages will be apparent as the invention is more fully understood from the following description, and taken in connection with the accompanying drawings, discloses a preferred mode of practising my invention.

Referring to the drawings:

Figure 1 is a perspective view of the completed product, that is to say, a piece of material having a surface veneered with a film of heat curable material;

Figure 2 is a sectional view of a curing press for forming a film or sheet of heat curable material for use in veneering lumber in accordance with the principles of my present invention, the sheet of heat curable material being shown between the co-operating platens of the press during the curing operation;

Figure 3 is a sectional view of the film or sheet of heat curable material after it has been cured between the platens of a curing press;

Figure 4 is a sectional view taken substantially along the line 4—4 in Figure 1 and showing the sheet or film of heat curable material secured to the woody foundation; and Figure 5 is an enlarged fragmentary view similar to Figure 4, illustrating in detail the mode of attaching the veneer to the base, and the possibility of veneering adjacent faces.

To illustrate my present invention, I have shown on the drawings a rectangular piece of wood 11 provided with a film 13 of heat curable material veneered to its upper surface.

In carrying out my invention I first form the film or sheet 13, which consists of a thin veneer sheet of heat curable material in its final re-acted or cured condition. The methods for producing such a thin veneer sheet are well-known and it will be sufficient for the present purpose to say that the sheet is made by forming a stack consisting of one or more sheets of paper or other suitable fibrous material, impregnating the stack with a suitable heat curable resin, subsequently drying the stack and finally curing the impregnated sheets by subjecting the stack to the action of heat and pressure between the co-operating platens of a heated press. Of course, it is obvious that the sheets forming the stack may be separately impregnated and then piled together, or the sheets may be arranged in a pile and thereafter impregnated with the heat curable material.

In Figure 2 of the drawings I have shown a stack of impregnated sheets 15 being compacted together between the co-operating platens 17 and 19 of a heated press to form the integral heat cured veneer sheet 13. The thickness of the finished sheet may vary, but I have found that, if it is at least one thirty-second of an inch in thickness, it will be sufficiently thick to protect the wood from warping or blistering at such points where excessive heat may afterwards be applied as in the case where a lighted match or cigarette may be carelessly laid upon the veneered surface. Figure 3 of the drawings shows the finished veneer sheet after it comes from the curing press.

Attempts have heretofore been made to cause a veeneer sheet of this make to adhere to the lumber by applying an adhesive such as glue, between the veneer and the lumber without the aid of heat and pressure. Veneer sheets made from heat curable material, however, are non-absorbent and offer no opportunity for the formation of a firm bond between the glue and the veneer sheet, so that lumber can be successfully veneered with heat curable material.

According to my present invention, the lower surface of the veneer sheet is roughened as at 23. This roughening may be accomplished during the molding process and while the heat curable material is in a plastic condition. To this end one of the press platens is provided with grooves or otherwise as shown at 21 in Figure 2 of the drawings. The surface of the veneer sheet also may be roughened by means of a grinding wheel or sand blast, or by milling suitable grooves in the veneer sheet in which case the platens of the heated press may be smooth, as is usually the case in such presses. After the veneer sheet has been formed with its lower surface roughened as aforesaid, I apply glue or other suitable adhesive 22, either to the roughened surface of the veneer sheet or to the surface of the lumber, which is to be veneered and then press the parts together. This may be accomplished in any suitable pressing device, the pressure applied being sufficient to force the roughened surface of the veneer sheet into the woody base, but being insufficient to seriously affect the mechanical structure of the base. If it is desired to expedite the operation, the press may be heated slightly in order to drive off the moisture from the glue. The heating, however, is not essential and such pressure as is required is far below that capable of crushing or otherwise deforming the wood.

I have found that by proceeding in the above described manner, a structural material may be obtained, which has special utility for the tops of desks, tables, drawers and similar articles of furniture. Veneered wall board and numerous other articles are also within the purview of my invention. Although the veneer sheet of heat curable material is more expensive than an equivalent volume of wood, the additional expense is small because the volume of the veneer sheet is small in proportion to the total amount of lumber used in the furniture. I have found that a veneer sheet having a thickness of one thirty-second of an inch is amply sufficient to form a thorough adequate protection for the wood and to prevent warping and blistering under ordinary abuse. It will be apparent, however, that the thickness of the veneer may be increased or decreased as desired.

My method of applying the veneer has a further advantage over such methods as have heretofore been employed. This advantage resides in the fact that the veneer may be prepared in one factory and the lumber in another, while the final assembly operation may take place in still a third factory, for it is not necessary to use the high heat and pressure in the final assembly, which must be assembled in a factory equipped to prepare the veneer sheet.

It is not essential that the adhesive 22 be in the form of ordinary glue, for other synthetic resins may be employed for the purpose. For instance, I may use a bakelite varnish, which is a solution of the resin in a suitable solvent so that the same may be applied in fluid form. Where a solution of a synthetic resin is utilized, as the adhesive 22, I apply the solution to the parts and squeeze them together in a heated press to drive off the solvent and cure the resin. By using a varnish of this type in this manner it will become cured and hardened without requiring a degree of pressure and heat necessary to the proper curing of a larger quantity of the heat curable material and hence the use of such varnish will not impair the structure of the lumber.

It is thought that the invention and numerous of its attendant advantages will be understood from the foregoing description, and it is obvious that numerous changes may be made in the form, construction and arrangement of the various parts without departing from the spirit and scope of the invention or sacrificing any of its material advantages, the form herein described being a preferred embodiment of the invention.

Having thus described my invention, what

I claim as new and desire to secure by Letters Patent is:

1. The method of veneering material with a film of heat curable material, which consists in pre-forming a cured veneer sheet with a roughened surface, interlaying a film of a suitable adhesive between said roughened surface and the surface to which the veneer is to be applied, and finally squeezing the parts together under pressure until the adhesive has set.

2. The method of veneering material with a heat curable resin, which consists in pre-forming a cured sheet of the resinous material with a roughened surface interlaying a film of a suitable adhesive between said roughened surface and the material to be veneered and thereafter squeezing the pre-formed sheet to the material under a pressure less than that required to deform the material to be veneered but sufficient to cause the roughened surface to bite into the material being veneered.

3. The method of veneering lumber with a layer of heat curable material, which consists in pre-forming a cured sheet of resinous material with a roughened surface interlaying a film of a suitable adhesive between said roughened surface and the lumber and thereafter squeezing the pre-formed sheet to the lumber firmly enough to force the roughened surface into the material being veneered while maintaining the pressure less than that required to deform the material to be veneered.

4. As an article of manufacture, a piece of material having a veneered surface comprising a base, a layer of heat cured resinous material having a roughened surface pressed into the base and a layer of suitable adhesive for securing the roughened surface of the heat cured layer to the finished surface of the said piece of material.

5. As an article of manufacture, a piece of lumber having a finished surface, a veneer sheet comprising a cured film of heat curable material having a roughened surface pressed into the surface of the lumber and an adhesive laid between the roughened surface of the veneer sheet of the lumber.

6. As an article of manufacture a veneered piece of wood consisting of a woody base, a veneer sheet of a thermoplastic material in its heat hardened inert form, said veneer sheet having an indented surface pressed firmly into a surface of the wooden base and a layer of adhesive interposed between the base and the veneer sheet.

In witness whereof, I have hereunto subscribed my name.

LOUIS T. FREDERICK.

CERTIFICATE OF CORRECTION.

Patent No. 1,779,426.  Granted October 28, 1930, to

LOUIS T. FREDERICK.

It is hereby certified that the above numbered patent should have been issued to "Continental Diamond Fibre Company, of Newark, Delaware, a corporation of Delaware", instead of "Continental Diamond Fibre Company, of Newark, New Jersey, a corporation of Delaware, as shown by the records of assignments in this office; and that the said Letters Patent should be read with this correction therein that the same may conform to the record of the case in the Patent Office.

Signed and sealed this 9th day of December, A. D. 1930.

(Seal)

M. J. Moore,
Acting Commissioner of Patents.